United States Patent
Guo et al.

(10) Patent No.: US 11,914,340 B2
(45) Date of Patent: Feb. 27, 2024

(54) METHOD FOR COMPENSATING SIGNAL OF MOTOR, ELECTRONIC APPARATUS AND STORAGE MEDIUM

(71) Applicant: AAC Technologies Pte. Ltd., Singapore (SG)

(72) Inventors: Xuan Guo, Shenzhen (CN); Zheng Xiang, Shenzhen (CN); Xiang Lu, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 882 days.

(21) Appl. No.: 16/941,540

(22) Filed: Jul. 29, 2020

(65) Prior Publication Data
US 2021/0041847 A1    Feb. 11, 2021

(30) Foreign Application Priority Data

Aug. 9, 2019  (CN) .......... 201910735390.X

(51) Int. Cl.
| | | |
|---|---|---|
| H02P 29/50 | (2016.01) | |
| G05B 19/404 | (2006.01) | |
| F04B 49/06 | (2006.01) | |
| H02K 41/02 | (2006.01) | |
| H02P 25/032 | (2016.01) | |
| G06F 3/01 | (2006.01) | |

(52) U.S. Cl.
CPC .......... *G05B 19/404* (2013.01); *F04B 49/065* (2013.01); *H02K 41/02* (2013.01); *H02P 25/032* (2016.02); *F04B 2203/0401* (2013.01); *F04B 2203/0406* (2013.01); *F04B 2203/0409* (2013.01); *G06F 3/016* (2013.01)

(58) Field of Classification Search
CPC ........ H02K 41/02; H02K 11/20; H02K 33/00; H02P 25/032
See application file for complete search history.

(56) References Cited

U.S. PATENT DOCUMENTS

| | | | | |
|---|---|---|---|---|
| 2007/0256428 A1* | 11/2007 | Unger | ............... | H02K 11/33 62/295 |
| 2013/0234642 A1* | 9/2013 | Igarashi | ............. | H02P 23/0004 318/611 |
| 2014/0071545 A1* | 3/2014 | Sumioka | ............. | H02N 2/0015 359/813 |
| 2018/0026572 A1* | 1/2018 | Ge | ........................ | H02P 29/50 318/135 |
| 2021/0025940 A1* | 1/2021 | Xiang | ................ | G01M 5/0066 |

* cited by examiner

Primary Examiner — Muhammad S Islam
(74) Attorney, Agent, or Firm — W&G Law Group

(57) ABSTRACT

A method for compensating a signal of a motor includes acquiring an original signal and nonlinear parameters of the motor; calculating a compensation signal for the original signal according to the acquired nonlinear parameters; and loading the calculated compensation signal into the motor to excite the motor to vibrate. An electronic apparatus and a storage medium are also provided. In this method, the original excitation signal is compensated for nonlinearity according to the nonlinear motor parameters, and is then used for exciting the motor. Therefore, the actual vibration effect can be closer to the expected effect as designed, which can bring more desirable tactility experience.

17 Claims, 2 Drawing Sheets

METHOD FOR COMPENSATING SIGNAL OF MOTOR, ELECTRONIC APPARATUS AND STORAGE MEDIUM

FIELD OF THE INVENTION

The present disclosure relates to the technical field of motor detection and, in particular, to a method, electronic apparatus and storage medium for compensating a signal of a motor.

BACKGROUND

With more and more extensive application of the tactile feedback technology in our life, many electronic products or touch screens provide the force feedback function, and there is a growing demand for the accuracy of vibration output effect. Linear motors (i.e., a linear resonant actuator, also denoted by LRA) are generally used to achieve this vibration effect. Therefore, there has been an increasingly higher requirement for high accuracy of controlling the linear motors. In general, during the vibration of the motor, its characteristic parameters change with the displacement of a vibrator of the motor, and thus are known as nonlinear parameters. Such a change may cause a difference between the actual vibration effect of the motor and the expected effect as designed, thereby affecting the tactile experience.

Therefore, it is necessary to provide a method for compensating a signal of a motor based on nonlinear parameters of the motor, which can make the actual vibration effect of the motor closer to the expected effect.

SUMMARY

Accordingly, the present disclosure is directed to a method for compensating a signal of a motor, which can make the actual vibration effect of the motor closer to the expected effect.

In one aspect, a method for compensating a signal of a motor is provided which can make the actual vibration effect of the motor closer to the expected effect. The method may include acquiring an original signal and nonlinear parameters of the motor; calculating a compensation signal for the original signal according to the acquired nonlinear parameters; and loading the calculated compensation signal into the motor to excite the motor to vibrate.

In one embodiment, the nonlinear parameters may include an electromagnetic force coefficient b, a spring stiffness coefficient k and a damping Rm, and the functions of the nonlinear parameters with respect to a vibrator displacement x are expressed as follows:

$$b(x)=b_0+b_1x+b_2x^2+\ldots+b_nx^n$$

$$k(x)=k_0+k_1x+k_2x^2+\ldots+k_nx^n$$

$$R_m(x)=R_0+R_1x+R_2x^2+\ldots+R_nx^n$$

where n is an arbitrary positive integer, and $b_0 \sim b_n$ and $k_0 \sim k_n$, $R_0 \sim R_n$ are nonlinear parameter coefficients.

In one embodiment, the nonlinear parameter coefficients may be calculated through a least mean square algorithm based on voltage values and current values of the motor.

In one embodiment, in the step of calculating a compensation signal for the original signal according to the acquired nonlinear parameters, the compensation signal for the original signal is calculated according to the acquired nonlinear parameters by a compensation equation, and the compensation equation is:

$$u=\alpha(x)[w+\beta(x)];$$

where x is the vibrator displacement, w is the original signal, u is the compensation signal, $\alpha(x)$ is the first compensation coefficient, and $\beta(x)$ is the second compensation coefficient.

In one embodiment, the first compensation coefficient is calculated according to the following formula:

$$a(x) = \frac{b(0)}{b(x_1)};$$

and the second compensation coefficient is calculated according to the following formula:

$$\beta(x) = -\frac{k(0)R_e}{b(0)}x_1 - \frac{R_eR_m(0)+k(0)L_e+b^2(0)}{b(0)}x_2 +$$
$$\frac{R_emk(x_1)+R_m(0)L_ek(x_1)}{mb(0)}x_1 + \frac{R_emR_m(x_1)+R_m(0)L_eR_m(x_1)}{mb(0)}x_2 -$$
$$\frac{R_emb(x_1)+R_m(0)L_eb(x_1)}{mb(0)}x_3 + \frac{k(x_1)L_e}{b_0}x_2 + \frac{k_x(x_1)L_e}{b(0)}x_1x_2 +$$
$$\frac{R_{mx}(x_1)L_e}{b(0)}x_2^2 - \frac{b_x(x_1)L_e}{b(0)}x_2x_3 - \frac{R_m(x_1)k(x_1)L_e}{mb(0)}x_1 -$$
$$\frac{R_m^2(x_1)L_e}{mb(0)}x_2 + \frac{R_m(x_1)b(x_1)L_e}{mb(0)}x_3 + \frac{b^2(x_1)}{b(0)}x_2 + \frac{R_eb(x_1)}{b(0)}x_3;$$

where $x_1=x$, $x_2=\dot{x}$, $x_3=i$, $b_x(x)=b_1+2b_2x+\ldots+nb_nx^{n-1}$, $k_x(x)=k_1+2k_2x+\ldots+nk_nx^{n-1}$, $b_{mx}(x)=R_1+2R_2x+\ldots+nR_nx^{n-1}$, and Re is a resistance, Le is an inductance, m is a vibrator mass, $\dot{x}$ is a vibrator speed, and i is current.

In one embodiment, loading the calculated compensation signal into the motor to excite the motor to vibrate includes converting the calculated compensation signal into an analog electric signal through a digital-to-analog converter; amplifying the analog electric signal through a power amplifier; and loading the amplified analog electrical signal to the motor.

In one embodiment, after the step of loading the calculated compensation signal into the motor to excite the motor to vibrate, the method for compensating a signal of a motor may further include acquiring vibration data of the excited motor; comparing the acquired vibration data with expected data; and acquiring an effect detection result.

In one embodiment, the step of acquiring the vibration data of the excited motor may include acquiring acceleration data of the motor through an accelerometer; amplifying the acceleration data through a signal amplifier; converting the amplified acceleration data into a digital signal through an analog-to-digital converter; and processing the digital signal to obtain the vibration data of the motor.

In another independent aspect, an electronic apparatus is provided which includes at least one processor, and a memory in communication with the at least one processor. The memory stores a motor signal compensation program executable by the at least one processor. The motor signal compensation program is executable by the at least one processor to perform a method for compensating a signal of a motor, the method including acquiring an original signal and nonlinear parameters of the motor; calculating a compensation signal for the original signal according to the acquired nonlinear parameters; and loading the calculated compensation signal into the motor to excite the motor to vibrate.

In still another independent aspect, a computer readable storage medium is provided which has a motor signal compensation program stored thereon. The motor signal compensation program is executable by at least one processor to perform a method for compensating a signal of a motor, the method including acquiring an original signal and nonlinear parameters of the motor; calculating a compensation signal for the original signal according to the acquired nonlinear parameters; and loading the calculated compensation signal into the motor to excite the motor to vibrate.

In summary, in the method for compensating a signal of a motor, the original excitation signal is compensated for nonlinearity according to the nonlinear motor parameters, and is then used for exciting the motor. Therefore, the actual vibration effect can be closer to the expected effect as designed, which can bring more desirable tactility experience.

Independent features and/or independent advantages of the invention may become apparent to those skilled in the art upon review of the detailed description, claims and drawings.

BRIEF DESCRIPTION OF THE DRAWINGS

In order to explain the technical solutions of the embodiments of the present disclosure more clearly, accompanying drawings used to describe the embodiments are briefly introduced below. It is evident that the drawings in the following description are only concerned with some embodiments of the present disclosure. For those skilled in the art, in a case where no inventive effort is made, other drawings may be obtained based on these drawings.

DESCRIPTION OF THE EMBODIMENTS

Embodiments of the present disclosure will be described further below with reference to the accompanying drawings.

First Embodiment

At present, although people have recognized the nonlinearity phenomenon of the motor, there has been no effective nonlinear compensation method or effective controlling method. Therefore, in practical application, the vibration effect of the motor is different from the desired ideal effect, which affects the user experience. The method for compensating a signal based on nonlinear parameters of a motor as proposed in this embodiment can improve this situation.

Figure 1:
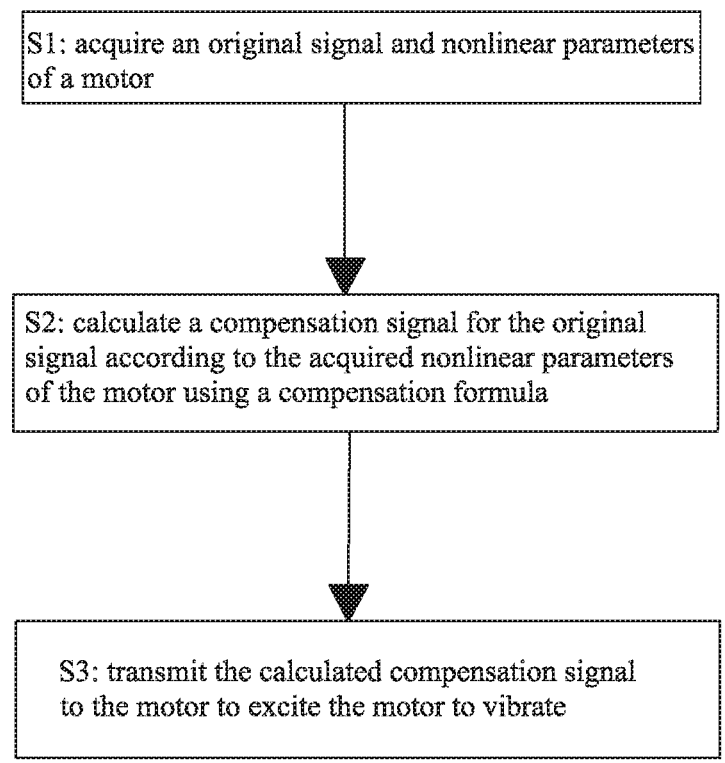
FIG. 1 is a flowchart of a method for compensating a signal of a motor according to one embodiment of the present disclosure.

As shown in FIG. 1, the first embodiment provides a method for compensating a signal of a motor, which includes the following steps.

At step S1, an original signal and nonlinear parameters of a motor are acquired. The nonlinear parameters include an electromagnetic force coefficient b, a spring stiffness coefficient k and a damping Rm; in actual implementation, the nonlinear parameters can be obtained directly by receiving externally-input nonlinear parameters, or can be calculated through a least mean square (LMS) algorithm based on the voltage data and current data of the motor. In this embodiment, the nonlinear parameters are preferably calculated through the LMS algorithm based on the voltage data and current data of the motor, so that the acquired data can be directly processed.

In particular, the steps of calculating the nonlinear parameter coefficients are as follows.

A voltage ue across the motor and current data i through the motor are acquired;

According to the following classical parameterized quadratic model of the motor:

$$u_e(t) = R_e i + \frac{d(L_e(x)I)}{dt} + b(x)\frac{dx}{dt}$$

$$b(x)I = m\frac{d^2x}{dt^2} + R_m(x)\frac{dx}{dt} + k(x)x$$

where Re is a motor resistance, Le is a motor inductance, x is a motor vibrator displacement, and m is a motor vibrator mass, an electrical equation of a motor vibrator speed can be written as:

$$\frac{dx}{dt}\bigg|_V = \frac{1}{b(x)}\left(u_e(t) - R_e i - \frac{d(L_e(x)i)}{dz}\right).$$

Then, a mechanics equation of the motor vibrator speed is obtained as follows:

$$\frac{dx}{dt}\bigg|_F = \mathcal{L}^{-1}\left\{\frac{s}{J(s)}\right\} * \left[b(x)i - (k(x) - K_0)x - (R_m(x) - R_0)v + \frac{i^2}{2}\frac{dL_e(x)}{dx}\right]$$

wherein $I(s) = ms^2 + R_0F + K_0$, and $\mathcal{L}^{-1}\{\ \}$ represents Laplace inverse transformation.

The difference e between the speeds calculated from the electrical equation and the mechanics equation is regarded as an error function, as follows:

$$s = \frac{dx}{dt}\bigg|_V - \frac{dx}{dt}\bigg|_F = \frac{1}{b(x)}\left(u_e(t) - R_e i - \frac{d(L_e(x)i)}{dt}\right) - $$

$$\mathcal{L}^{-1}\left\{\frac{s}{J(s)}\right\} * \left[b(x)i - (k(x) - K_0)x - (R_m(x) - R_0)v + \frac{i^2}{2}\frac{dL_e(x)}{dx}\right]$$

According to the LMS algorithm, updated expressions of respective nonlinear parameter coefficients are written as follows, the parameters are iteratively updated, and the final convergence values are identified as the nonlinear parameter coefficients of the motor:

$$b_f = b_f - \mu s \frac{\partial s}{\partial b_j}$$

$$L_f = L_f - \mu s \frac{\partial s}{\partial L_j}$$

$$k_f = k_f - \mu s \frac{\partial s}{\partial k_j}$$

$$R_f = R_f - \mu s \frac{\partial s}{\partial R_j}$$

where j is a subscript of the nonlinear coefficients, and its value range is 1-n.

When j=0, the coefficients b0, k0, R0 and L0 represent the linear parameters of the motor, which can be obtained by a LS fitting method. It should be noted that the parameter μ in the above four equations may be different, and can be adjusted according to the actual situation. In the identification of the nonlinear parameters of the motor, besides the three parameters b(x), k(x) and Rm(x) mentioned in the compensation method herein, the inductance Le(x) is also included, and its expression is similar to those of the first three parameters:

$$L_e(x) = L_0 + L_1 x + L_2 x^2 + \ldots + L_n x^n.$$

The nonlinear parameter model of the motor includes six parameters of the motor, namely the resistance Re, the inductance Le, the vibrator mass m and the aforementioned three nonlinear parameters (the electromagnetic force coefficient b, the spring stiffness coefficient k, and the damping Rm), wherein the nonlinear parameters b, k and Rm can be regarded as functions with respect to the vibrator displacement x, and their relationships are expressed as follows:

$$b(x) = b_0 + b_1 x + b_2 x^2 + \ldots + b_n x^n;$$

$$k(x) = k_0 + k_1 x + k_2 x^2 + \ldots + k_n x^n; \text{ and}$$

$$R_m(x) = R_0 + R_1 x + R_2 x^2 + \ldots + R_n x^n.$$

In the above equations, n is an arbitrary positive integer, $b_0 \sim b_n$, $k_0 \sim k_n$, and $R_0 \sim R_n$ are nonlinear parameter coefficients, which can be acquired by calculating through a LMS algorithm based on the voltage and current data of the motor, and will not be described in detail herein.

At step S2, a compensation signal for the original signal is calculated according to the acquired nonlinear parameters. In this embodiment, it is preferable to use the state-space linearization theory in calculation of the compensation signal. The main purpose of using the state-space linearization theory in the calculation is to generate an output that is more consistent with the output of the linear model. The state-space linearization theory can be understood as follows: under the condition of a known nonlinear model, the same output as that of a linear model can be realized through signal compensation. The output of the linear model is the expected output as designed. When the signal outputted to the motor is the same, the final vibration effects are closer.

In this embodiment, more preferably, the compensation signal for the original signal is calculated according to a compensation equation:

$$u = \alpha(x)[w + \beta(x)],$$

where x is the vibrator displacement, w is the original signal, u is the compensation signal, $\alpha(x)$ is a first compensation coefficient, and $\beta(x)$ is a second compensation coefficient. By compensating the original signal, the influence of the nonlinear parameters on the whole calculation process is compensated. Here, the first compensation coefficient and the second compensation coefficient are both related to the nonlinear parameters, and can be calculated based on the nonlinear parameters.

In this embodiment, more preferably, the first compensation coefficient is calculated according to the following formula:

$$\alpha(x) = \frac{b(0)}{b(x_1)};$$

and the second compensation coefficient is calculated according to the following formula:

$$\beta(x) = -\frac{k(0)R_e}{b(0)} x_1 - \frac{R_e R_m(0) + k(0)L_e + b^2(0)}{b(0)} x_2 +$$
$$\frac{R_e m k(x_1) + R_m(0)L_e k(x_1)}{mb(0)} x_1 + \frac{R_e m R_m(x_1) + R_m(0)L_e R_m(x_1)}{mb(0)} x_2 -$$
$$\frac{R_e m b(x_1) + R_m(0)L_e b(x_1)}{mb(0)} x_3 + \frac{k(x_1)L_e}{b_0} x_2 + \frac{k_x(x_1)L_e}{b(0)} x_1 x_2 +$$
$$\frac{R_{mx}(x_1)L_e}{b(0)} x_2^2 - \frac{b_x(x_1)L_e}{b(0)} x_2 x_3 - \frac{R_m(x_1)k(x_1)L_e}{mb(0)} x_1 -$$
$$\frac{R_m^2(x_1)L_e}{mb(0)} x_2 + \frac{R_m(x_1)b(x_1)L_e}{mb(0)} x_3 + \frac{b^2(x_1)}{b(0)} x_2 + \frac{R_e b(x_1)}{b(0)} x_3;$$

where $x_1 = x$, $x_2 = \dot{x}$, $x_3 = i$, $b_x(x) = b_1 + 2b_2 x + \ldots + nb_n x^{n-1}$, $k_x(x) = k_1 + 2k_2 x + \ldots + nk_n x^{n-1}$, $R_{mx}(x) = R_1 + 2R_2 x + \ldots + nR_n x^{n-1}$, and Re is a resistance, Le is an inductance, m is a vibrator mass, b is the electromagnetic force coefficient, k is the spring stiffness coefficient, Rm is the damping, x is the vibrator displacement, $\dot{x}$ is the vibrator speed, and i is the current.

At step S3, the calculated compensation signal is transmitted to the motor to excite the motor. More preferably, the calculated compensation signal is processed by a digital-to-analog converter and a power amplifier to generate excitation which is loaded to the motor. Specifically, the calculated compensation signal is converted into an analog electrical signal by the digital-to-analog converter; the analog electric signal is amplified through the power amplifier; and the amplified analog electrical signal is loaded into the motor. The original excitation signal is compensated for nonlinearity according to the current motor parameters, and then used for exciting the motor. Therefore, the actual vibration effect is closer to the expected effect as designed, which effectively reduces the influence of nonlinearity.

Once the above steps are performed, calculation of compensation for the original signal and transmission of the compensated signal are completed. In order to further check the effect, it is necessary to further detect and compare the vibration resulted by the compensated signal. Specifically, after step S3, the following steps are also included:

acquiring vibration data of the excited motor;
comparing the vibration data with expected data; and
acquiring an effect detection result.

The step of obtaining the vibration data of the excited motor includes:

acquiring acceleration data of the motor through an accelerometer;
amplifying the acceleration data through a signal amplifier;
converting the amplified acceleration data into a digital signal through an analog-to-digital converter; and
processing the digital signal to obtain the vibration data of the motor. The vibration data of the excited motor is acquired by the accelerometer, and the vibration data is compared with the expected data to detect the compensation result.

In actual implementation, the motor can be fixed on a tooling, or alternatively in a mobile phone or on other loads. Regarding the measurement of the vibration data (i.e., the acceleration), the measuring apparatus such as the accelerometer can be fixed on the tooling or other loads connected with the motor.

Figure 2:
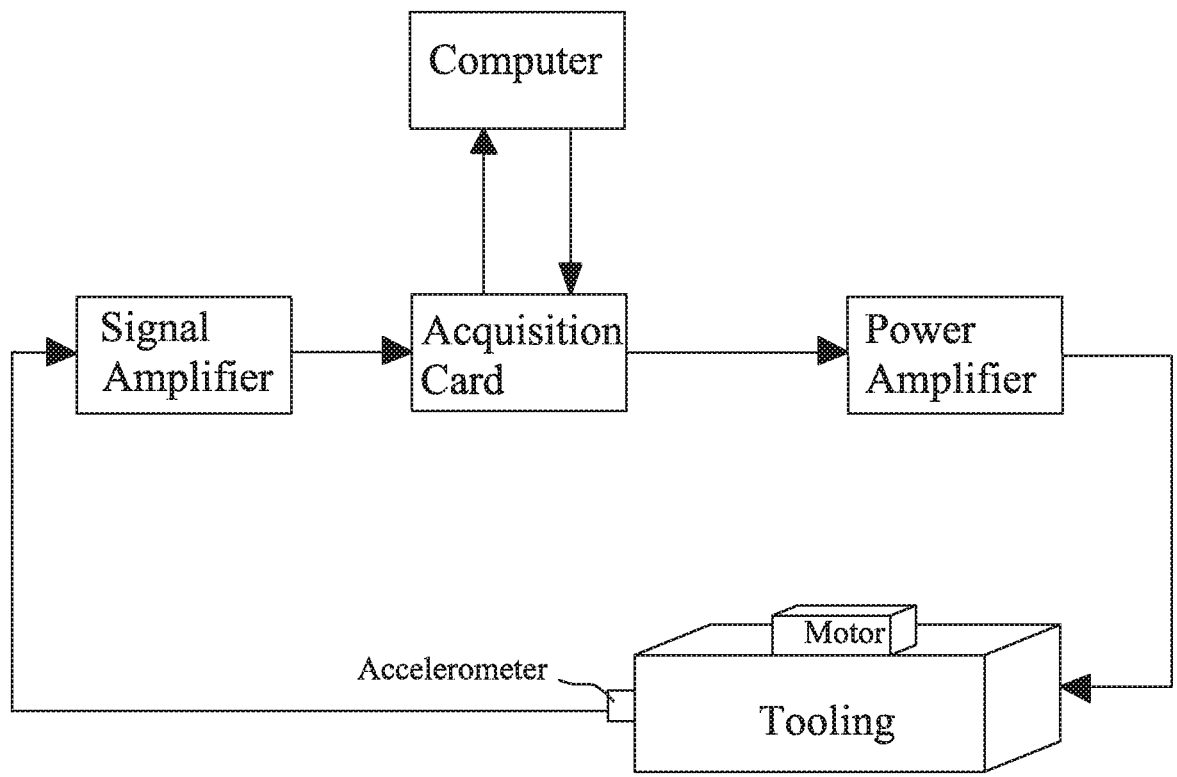
FIG. 2 is a functional block diagram of a motor excitation circuit according to one embodiment of the present disclosure.

FIG. 2 shows a laboratory environment which is used as an implementation environment in which a comparison is made between the vibration effects before and after compensation for the original signal.

Firstly, the designed original signal is outputted from a computer PC. A digital electrical signal is converted into an analog electrical signal by an acquisition card. Through a power amplifier, the analog electrical signal is loaded across the motor for exciting the motor. Acceleration data is acquired through an accelerometer. The acceleration data is amplified by a signal amplifier. The analog signal is converted into a digital signal by the acquisition card, and is then inputted into and processed by the PC to finally obtain the measurement result of the vibration data. In the above operations, the original signal is not compensated for nonlinearity. Therefore, the actual vibration effect of the motor is different from the expected effect as designed due to the existence of the nonlinear parameters.

Afterwards, a compensation signal is used to sequentially perform the above steps. In this embodiment, the compensation signal is calculated by the computer. However, obtaining of the compensation signal is not intended to be limited to the computer calculation. Rather, the compensation signal can alternatively be calculated by another apparatus capable of data processing in another embodiment.

The compensation signal is specifically transmitted as follows. The calculated compensation signal is outputted from the computer PC. A digital electrical signal is converted into an analog electrical signal by the acquisition card. Through the power amplifier, the analog electrical signal is loaded across the motor for exciting the motor. Acceleration data is acquired through the accelerometer. The acceleration data is amplified by the signal amplifier. The analog signal is converted into a digital signal by the acquisition card, and is then inputted into and processed by the PC to finally obtain the measurement result of the vibration data with the nonlinear compensation. The vibration data with the nonlinear compensation and the non-compensated original vibration data are respectively compared with the expected vibration data as designed, and it can then be found that the compensated vibration data is closer to the expected data in terms of both absolute figure and waveform.

Second Embodiment

Figure 3:
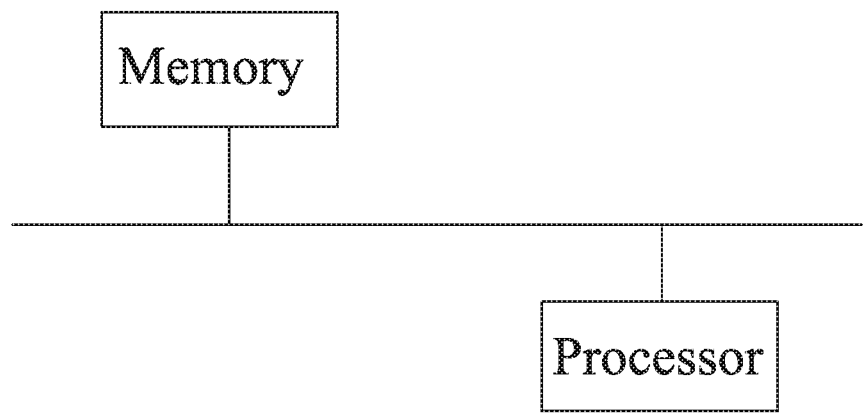
FIG. 3 is a circuit block diagram of an electronic apparatus according to one embodiment of the present disclosure.

FIG. 3 illustrates an electronic apparatus in accordance with a second embodiment. The electronic apparatus includes at least one processor and a memory in communication with the at least one processor. The memory has a motor signal compensation program stored thereon. The motor signal compensation program is a computer-executable program, which can be executed by the processor to perform the method for compensating a signal of a motor as discussed in the first embodiment. The electronic apparatus can be implemented as, among others, a mobile phone, a computer, a tablet computer, an analog-to-digital (digital-to-analog) conversion apparatus, a power amplification apparatus, or a signal amplification apparatus.

Third Embodiment

The third embodiment discloses a storage medium, which is a computer readable storage medium with a motor signal compensation program stored thereon. The motor signal compensation program is a computer program which can be executed by at least one processor to perform the method for compensating a signal of a motor as discussed in the first embodiment.

Although the computer-executable program contained in the storage medium provided by the above embodiment of the present disclosure is executed by the processor to perform the method steps as discussed above, it should be understood that the storage medium may contain a computer-executable program that can be executed by a processor to perform other method steps provided by other embodiments of the present disclosure.

People skilled in the art can understand that all or part of the steps in the method for implementing the embodiments of the present disclosure can be completed by instructing relevant hardware through a program. The program is stored in a storage medium and comprises a plurality of instructions for enabling one apparatus (which may be a personal computer, a server, or a network apparatus, etc.) or a processor to execute all or part of the steps of the method disclosed herein. The storage medium comprises a USB flash disk, a mobile hard disk, a read-only memory (ROM), a random access memory (RAM), a flash memory (FLASH), a magnetic disk, an optical disk, and other medium capable of storing program codes.

Although the disclosure is described with reference to one or more embodiments, it will be apparent to those skilled in the art that various modifications and variations can be made to the disclosed structure and method without departing from the scope or spirit of the disclosure. In view of the foregoing, it is intended that the present disclosure cover modifications and variations of this invention provided they fall within the scope of the following claims and their equivalents.

What is claimed is:

1. A method for compensating a signal of a motor, comprising:
acquiring an original signal and nonlinear parameters of the motor;
calculating a compensation signal for the original signal according to the acquired nonlinear parameters; and
loading the calculated compensation signal into the motor to excite the motor to vibrate, wherein
the nonlinear parameters comprise an electromagnetic force coefficient b, a spring stiffness coefficient k and a damping Rm, and the functions of the nonlinear parameters with respect to a vibrator displacement x are expressed as follows:

$$b(x)=b_0+b_1x+b_2x^2+\ldots+b_nx^n$$

$$k(x)=k_0+k_1x+k_2x^2+\ldots+k_nx^n$$

$$R_m(x)=R_0+R_1x+R_2x^2+\ldots+R_nx^n$$

where n is an arbitrary positive integer, and $b_0$~$b_n$ and $k_0$~$k_n$, $R_0$~$R_n$ are nonlinear parameter coefficients.

2. The method for compensating a signal of a motor according to claim 1, wherein the nonlinear parameter coefficients are calculated through a least mean square algorithm based on voltage values and current values of the motor.

3. The method for compensating a signal of a motor according to claim 1, wherein loading the calculated compensation signal into the motor to excite the motor to vibrate comprises:
  converting the calculated compensation signal into an analog electric signal through a digital-to-analog converter;
  amplifying the analog electric signal through a power amplifier; and
  loading the amplified analog electrical signal to the motor.

4. The method for compensating a signal of a motor according to claim 1, wherein after the step of loading the calculated compensation signal into the motor to excite the motor to vibrate, the method for compensating a signal of a motor further comprises:
  acquiring vibration data of the excited motor;
  comparing the acquired vibration data with expected data; and
  acquiring an effect detection result.

5. The method for compensating a signal of a motor according to claim 2, wherein in the step of calculating a compensation signal for the original signal according to the acquired nonlinear parameters, the compensation signal for the original signal is calculated according to the acquired nonlinear parameters by a compensation equation, and the compensation equation is:

$$u=\alpha(x)[w+\beta(x)];$$

where x is the vibrator displacement, w is the original signal, u is the compensation signal, $\alpha(x)$ is the first compensation coefficient, and $\beta(x)$ is the second compensation coefficient.

6. The method for compensating a signal of a motor according to claim 5, wherein the first compensation coefficient is calculated according to the following formula:

$$\alpha(x) = \frac{b(0)}{b(x_1)};$$

and
  the second compensation coefficient is calculated according to the following formula:

$$\beta(x) = -\frac{k(0)R_e}{b(0)}x_1 - \frac{R_e R_m(0) + k(0)L_e + b^2(0)}{b(0)}x_2 + \frac{R_e mk(x_1) + R_m(0)L_e k(x_1)}{mb(0)}x_1 + \frac{R_e mR_m(x_1) + R_m(0)L_e R_m(x_1)}{mb(0)}x_2 - \frac{R_e mb(x_1) + R_m(0)L_e b(x_1)}{mb(0)}x_3 + \frac{k(x_1)L_e}{b_0}x_2 + \frac{k_x(x_1)L_e}{b(0)}x_1 x_2 + \frac{R_{mx}(x_1)L_e}{b(0)}x_2^2 - \frac{b_x(x_1)L_e}{b(0)}x_2 x_3 - \frac{R_m(x_1)k(x_1)L_e}{mb(0)}x_1 - \frac{R_m^2(x_1)L_e}{mb(0)}x_2 + \frac{R_m(x_1)b(x_1)L_e}{mb(0)}x_3 + \frac{b^2(x_1)}{b(0)}x_2 + \frac{R_e b(x_1)}{b(0)}x_3;$$

where $x_1=x$, $x_2=\dot{x}$, $x_3=i$, $b_x(x)=b_1+2b_2x+\ldots+nb_nx^{n-1}$, $k_x(x)=k_1+2k_2x+\ldots+nk_nx^{n-1}$, $b_{mx}(x)=R_1+2R_2x+\ldots+nR_nx^{n-1}$, and Re is a resistance, Le is an inductance, m is a vibrator mass, $\dot{x}$ is a vibrator speed, and i is current.

7. The method for compensating a signal of a motor according to claim 4, wherein the step of acquiring the vibration data of the excited motor comprises:
  acquiring acceleration data of the motor through an accelerometer;
  amplifying the acceleration data through a signal amplifier;
  converting the amplified acceleration data into a digital signal through an analog-to-digital converter; and
  processing the digital signal to obtain the vibration data of the motor.

8. An electronic apparatus comprising:
  at least one processor; and
  a memory in communication with the at least one processor, the memory storing a motor signal compensation program executable by the at least one processor, the motor signal compensation program being executable by the at least one processor to perform a method for compensating a signal of a motor, the method comprising:
    acquiring an original signal and nonlinear parameters of the motor;
    calculating a compensation signal for the original signal according to the acquired nonlinear parameters; and
    loading the calculated compensation signal into the motor to excite the motor to vibrate, wherein
  the nonlinear parameters comprise an electromagnetic force coefficient b, a spring stiffness coefficient k and a damping Rm, and the functions of the nonlinear parameters with respect to a vibrator displacement x are expressed as follows:

$$b(x)=b_0+b_1x+b_2x^2+\ldots+b_nx^n$$

$$k(x)=k_0+k_1x+k_2x^2+\ldots+k_nx^n$$

$$R_m(x)=R_0+R_1x+R_2x^2+\ldots+R_nx^n$$

where n is an arbitrary positive integer, and $b_0$~$b_n$ and $k_0$~$k_n$, $R_0$~$R_n$ are nonlinear parameter coefficients.

9. The electronic apparatus according to claim 8, wherein the nonlinear parameter coefficients are calculated through a least mean square algorithm based on voltage values and current values of the motor.

10. The electronic apparatus according to claim 8, wherein loading the calculated compensation signal into the motor to excite the motor to vibrate comprises:
  converting the calculated compensation signal into an analog electric signal through a digital-to-analog converter;
  amplifying the analog electric signal through a power amplifier; and
  loading the amplified analog electrical signal to the motor.

11. The electronic apparatus according to claim 8, wherein after the step of loading the calculated compensation signal into the motor to excite the motor to vibrate, the method for compensating a signal of a motor further comprises:
  acquiring vibration data of the excited motor;
  comparing the acquired vibration data with expected data; and
  acquiring an effect detection result.

12. The electronic apparatus according to claim 9, wherein in the step of calculating a compensation signal for the original signal according to the acquired nonlinear parameters, the compensation signal for the original signal is calculated according to the acquired nonlinear parameters by a compensation equation, and the compensation equation is:

$$u=\alpha(x)[w+\beta(x)];$$

where x is the vibrator displacement, w is the original signal, u is the compensation signal, $\alpha(x)$ is the first compensation coefficient, and $\beta(x)$ is the second compensation coefficient.

13. The method for compensating a signal of a motor according to claim 11, wherein the step of acquiring the vibration data of the excited motor comprises:
   acquiring acceleration data of the motor through an accelerometer;
   amplifying the acceleration data through a signal amplifier;
   converting the amplified acceleration data into a digital signal through an analog-to-digital converter; and
   processing the digital signal to obtain the vibration data of the motor.

14. The electronic apparatus according to claim 12, wherein the first compensation coefficient is calculated according to the following formula:

$$\alpha(x) = \frac{b(0)}{b(x_1)};$$

and
   the second compensation coefficient is calculated according to the following formula:

$$\beta(x) = -\frac{k(0)R_e}{b(0)}x_1 - \frac{R_eR_m(0)+k(0)L_e+b^2(0)}{b(0)}x_2 +$$

$$\frac{R_emk(x_1)+R_m(0)L_ek(x_1)}{mb(0)}x_1 + \frac{R_emR_m(x_1)+R_m(0)L_eR_m(x_1)}{mb(0)}x_2 -$$

$$\frac{R_emb(x_1)+R_m(0)L_eb(x_1)}{mb(0)}x_3 + \frac{k(x_1)L_e}{b_0}x_2 + \frac{k_x(x_1)L_e}{b(0)}x_1x_2 +$$

$$\frac{R_{mx}(x_1)L_e}{b(0)}x_2^2 - \frac{b_x(x_1)L_e}{b(0)}x_2x_3 - \frac{R_m(x_1)k(x_1)L_e}{mb(0)}x_1 -$$

$$\frac{R_m^2(x_1)L_e}{mb(0)}x_2 + \frac{R_m(x_1)b(x_1)L_e}{mb(0)}x_3 + \frac{b^2(x_1)}{b(0)}x_2 + \frac{R_eb(x_1)}{b(0)}x_3$$

where $x_1=x$, $x_2=\dot{x}$, $x_3=i$, $b_x(x)=b_1+2b_2x+\ldots+nb_nx^{n-1}$, $k_x(x)=k_1+2k_2x+\ldots+nk_nx^{n-1}$, $b_{mx}(x)=R_1+2R_2x+\ldots+nR_nx^{n-1}$, and Re is a resistance, Le is an inductance, m is a vibrator mass, $\dot{x}$ is a vibrator speed, and i is current.

15. A computer readable storage medium having a motor signal compensation program stored thereon, the motor signal compensation program being executable by at least one processor to perform a method for compensating a signal of a motor, the method comprising:
   acquiring an original signal and nonlinear parameters of the motor;
   calculating a compensation signal for the original signal according to the acquired nonlinear parameters; and
   loading the calculated compensation signal into the motor to excite the motor to vibrate wherein
   the nonlinear parameters comprise an electromagnetic force coefficient b, a spring stiffness coefficient k and a damping Rm, and the functions of the nonlinear parameters with respect to a vibrator displacement x are expressed as follows:

$$b(x)=b_0+b_1x+b_2x^2+\ldots+b_nx^n$$

$$k(x)=k_0+k_1x+k_2x^2+\ldots+k_nx^n$$

$$R_m(x)=R_0+R_1x+R_2x^2+\ldots+R_nx^n$$

where n is an arbitrary positive integer, and $b_0 \sim b_n$ and $k_0 \sim k_n$, $R_0 \sim R_n$ are nonlinear parameter coefficients.

16. The computer readable storage medium according to claim 15, wherein in the step of calculating a compensation signal for the original signal according to the acquired nonlinear parameters, the compensation signal for the original signal is calculated according to the acquired nonlinear parameters by a compensation equation, and the compensation equation is:

$$u = \alpha(x)[w + \beta(x)];$$

where x is the vibrator displacement, w is the original signal, u is the compensation signal, $\alpha(x)$ is the first compensation coefficient, and $\beta(x)$ is the second compensation coefficient.

17. The computer readable storage medium according to claim 16, wherein the first compensation coefficient is calculated according to the following formula:

$$\alpha(x) = \frac{b(0)}{b(x_1)};$$

and
   the second compensation coefficient is calculated according to the following formula:

$$\beta(x) = -\frac{k(0)R_e}{b(0)}x_1 - \frac{R_eR_m(0)+k(0)L_e+b^2(0)}{b(0)}x_2 +$$

$$\frac{R_emk(x_1)+R_m(0)L_ek(x_1)}{mb(0)}x_1 + \frac{R_emR_m(x_1)+R_m(0)L_eR_m(x_1)}{mb(0)}x_2 -$$

$$\frac{R_emb(x_1)+R_m(0)L_eb(x_1)}{mb(0)}x_3 + \frac{k(x_1)L_e}{b_0}x_2 + \frac{k_x(x_1)L_e}{b(0)}x_1x_2 +$$

$$\frac{R_{mx}(x_1)L_e}{b(0)}x_2^2 - \frac{b_x(x_1)L_e}{b(0)}x_2x_3 - \frac{R_m(x_1)k(x_1)L_e}{mb(0)}x_1 -$$

$$\frac{R_m^2(x_1)L_e}{mb(0)}x_2 + \frac{R_m(x_1)b(x_1)L_e}{mb(0)}x_3 + \frac{b^2(x_1)}{b(0)}x_2 + \frac{R_eb(x_1)}{b(0)}x_3;$$

where $x_1=x$, $x_2=\dot{x}$, $x_3=i$, $b_x(x)=b_1+2b_2x+\ldots+nb_nx^{n-1}$, $k_x(x)=k_1+2k_2x+\ldots+nk_nx^{n-1}$, $b_{mx}(x)=R_1+2R_2x+\ldots+nR_nx^{n-1}$, and Re is a resistance, Le is an inductance, m is a vibrator mass, $\dot{x}$ is a vibrator speed, and i is current.

* * * * *